Sept. 29, 1925.
S. B. HASELTINE
FRICTION SHOCK ABSORBING MECHANISM
Filed Oct. 13, 1923    2 Sheets-Sheet 2
1,555,668
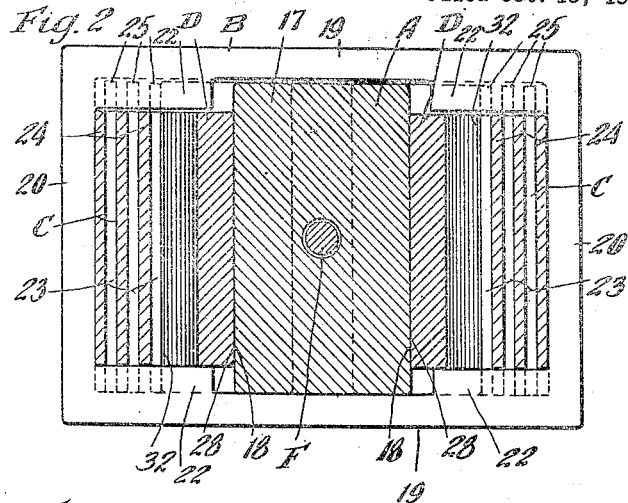
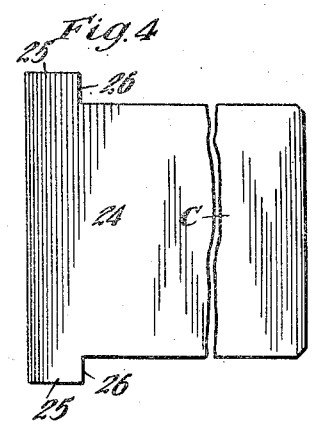
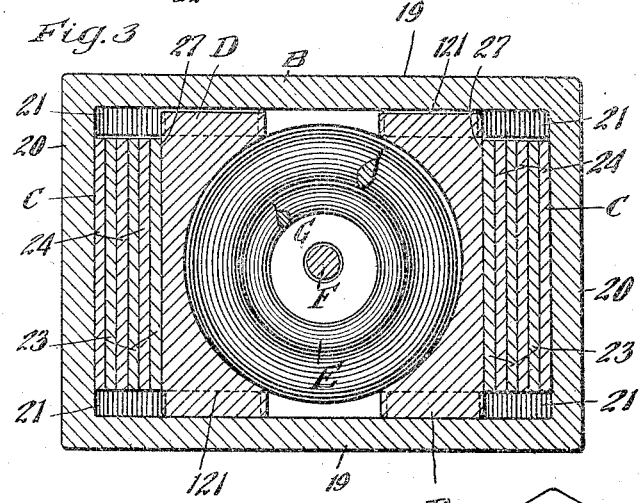
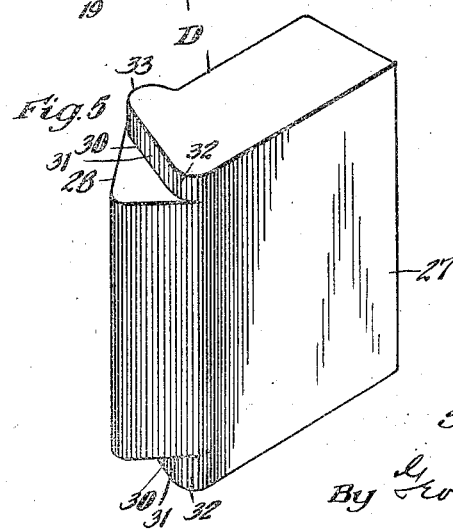
Witness
Wm. Geiger
Inventor
Stacy B. Haseltine
By George I. Haight
his Atty.

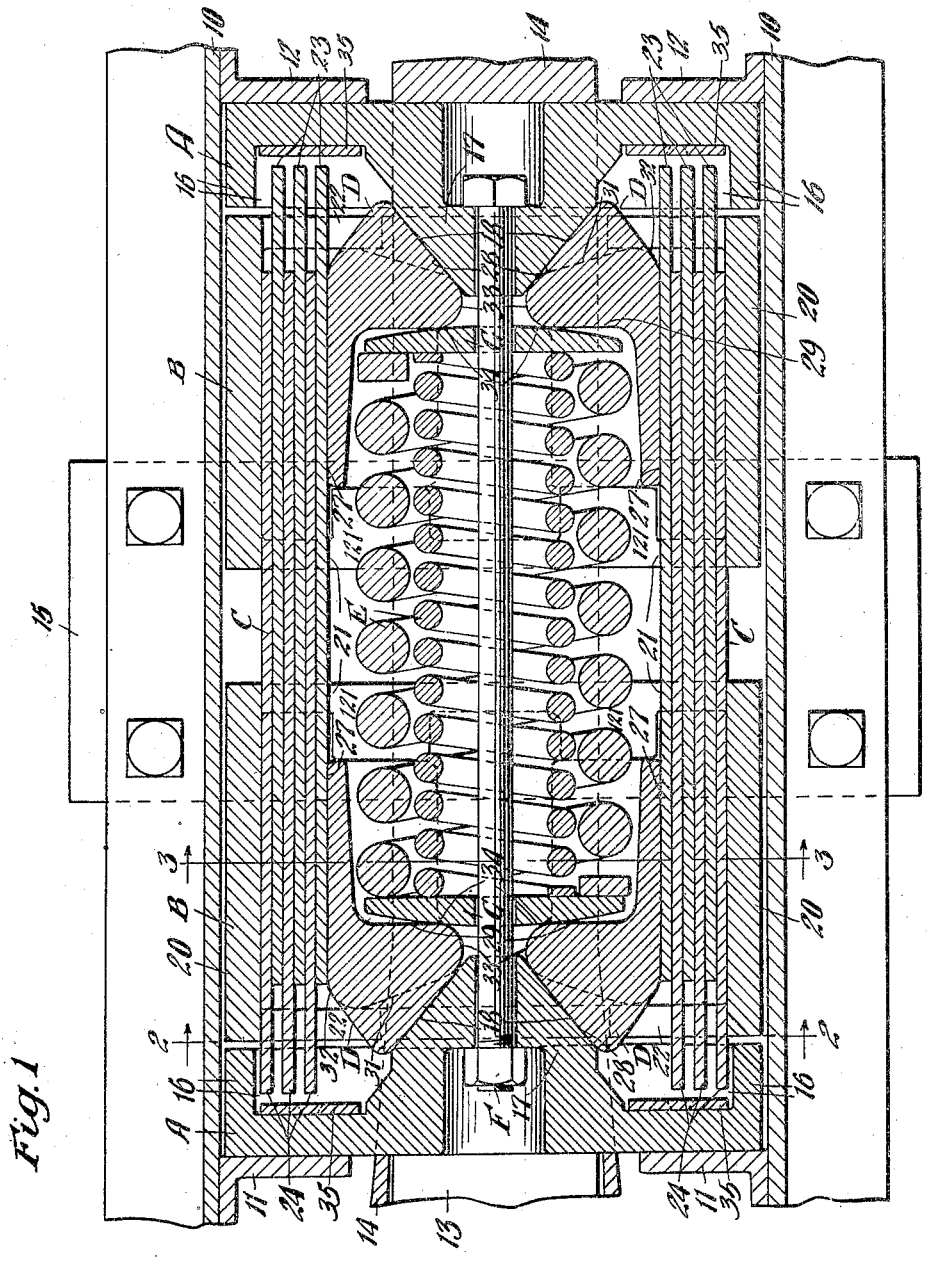

Patented Sept. 29, 1925.

1,555,668

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed October 13, 1923. Serial No. 668,284.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, more particularly adapted for railway draft riggings, wherein is obtained high capacity due to the large frictional areas together with quick and certain release.

Another object of the invention is to provide a friction shock absorbing mechanism, of the intercalated plate type, wherein a graduated action in both compression and release is obtained, by providing a preliminary action of the followers and wedges prior to engagement and movement of the friction plates by the followers, and thereafter a relative movement of the friction plates after the full wedging action has been set up, the friction shoes being so mounted as to rock during release to break the frictional resistance between the same and the adjacent plates.

Other objects and advantages of the invention will more clearly appear from the descriptions and claims hereinafter following.

In the drawings forming a part of this specification, Figure 1 is a horizontal, longitudinal, sectional view of a portion of a draft rigging, showing my improved shock absorbing mechanism in connection therewith. Figures 2 and 3 are vertical, transverse, sectional views corresponding substantially to the lines 2—2 and 3—3 of Figure 1. Fig. 4 is a detailed, side elevational view of one of the friction plates. And Fig. 5 is a detailed, perspective view of one of the wedge shoes.

In said drawings, 10—10 indicate channel draft sills, to the inner faces of which are secured front stop lugs 11 and rear stop lugs 12. A portion of the draw-bar is shown at 13 to which is attached a hooded yoke 14. The shock absorbing mechanism proper including the front and rear followers, is disposed within the yoke 14, and the movable parts of the draft rigging are supported by the detachable saddle plate 15.

The improved shock absorbing mechanism proper, as shown, comprises, broadly, front and rear wedge followers A—A; front and rear friction shells B—B; two groups of friction plates C—C; front and rear pairs of friction shoes D—D; a spring resistance E; a retainer bolt F; and front and rear spring followers G—G.

The front and rear wedge followers are of like construction and coact respectively with the front and rear stop lugs in the usual manner. Each follower A is of rectangular shape and is provided with spaced, inwardly projecting top, bottom and side flanges 16—16 and an inwardly projecting hollow wedge portion 17, disposed centrally between the side flanges and extending from the top flange to the bottom flange of the follower. The projecting wedge portion 17 of each follower protrudes beyond the inner edges of the flanges 16 and is provided with vertically disposed, inwardly converging side faces 18.

The front and rear friction shells B are of like construction, each being of substantially box-like shape and comprising horizontally disposed top and bottom walls 19—19 and vertically disposed spaced walls 20—20. At the inner end of each shell B the top and bottom walls are provided respectively with downwardly and upwardly projecting transverse ribs 21 extending inwardly a short distance from the side walls, said ribs being adapted to guide the upper and lower edges of the friction plates. The upper and lower walls at the rear end of each shell B are also respectively provided with spaced bearing lugs 121, having flat front bearing faces. At the outer end of each shell B, the top and bottom walls are provided respectively with downwardly and upwardly projecting, transverse flanges 22, the same being cut away centrally to permit insertion of the friction shoes D.

The friction plates C are arranged within the shells B and comprise two oppositely disposed groups. As herein shown, the groups of plates C each comprises three plates 23 and three plates 24, the plates 23 and 24 being alternated, with the plates 24 of each group arranged outermost and in contact with the inner surfaces of the adjacent side walls 20 of the front and rear shells B. The plates 23 and 24 are of similar construction, and as best shown in Figure 4, each plate is provided with upper and lower projections 25 at one end thereof, thereby providing a T-head construction having ververtically alined upper and lower stop shoulders 26. As shown in Figure 1, the plates 23 and 24 are alternated and reversely arranged, with the projections 25 of the plates 23 disposed outwardly of and co-acting with the flanges 22 of the rear friction shell B and the projections 25 of the plates 24 coacting with the flanges 22 of the front friction shell B, and the main portion of the plates extending between the ribs 21 of both shells, and guided thereby.

The wedge friction shoes D are all of like construction, being in the form of elongated blocks arranged in pairs at the front and rear ends of the mechanism. Each of the shoes D, as best shown in Figure 5, has a flat side face 27 adapted to engage the adjacent friction plate 23, an outer wedge face 28 similarly inclined to, and adapted to coact with, one of the follower wedge faces 18, and a relatively flat transverse face 29 adapted to coact with the corresponding spring follower plate G. Each of the shoes D has the outer end portion thereof cut away at the upper and lower sides as indicated at 30 thereby providing flat faces 31 and rounded bearing portions 32 at the ends of the faces 31 adjacent the side faces 27. The rounded bearing portions 32 of the shoes D are adapted to abut and rock on the inner faces of the flanges 22 of the front and rear shells respectively, for a purpose hereinafter described. Each of the shoes is also rounded off between the wedge face 18 and the flat transverse face 29 thereof, as indicated at 33 so that the shoe may have rocking movement on the corresponding spring follower plate G. The rear ends of the shoes D are adapted to abut the front faces of the abutment lugs 121, said ends being slightly rounded for a portion thereof to provide proper clearance during the swinging movement of the shoes.

The inner and outer coils of the spring resistance E coact with the front and rear shoes D and have the opposite ends thereof abutting, respectively, the front and rear spring follower plates G.

Each of the spring followers G is in the form of a rectangular plate having a transversely curved, outer bearing face 34 adapted to coact with the rounded portions 33 and the adjacent flat surfaces 29 of the corresponding pair of wedge shoes D.

Wear plates 35, adapted to form abutments for the ends of the friction plates are preferably provided, the same being secured to the inner faces of the front and rear followers at opposite sides of the central projections 17.

The friction shock absorbing mechanism is held under initial compression by the retainer bolt F, passing through the inner coil of the spring resistance and alined openings in the spring follower G and the wedge projections 17, having one end thereof anchored to the rear follower by means of a head received in the hollow projection 17 thereof and having the other end anchored to the front follower by means of a nut received in the corresponding hollow projection 17.

When the parts are in normal position, as clearly shown in Figure 1, the friction shell members are held in the extreme outermost position and slightly spaced from the inner ends of the flanges of the front and rear followers by the expansive forces of the spring resistance E, with the outer faces of the flanges 22 of the front and rear shells engaging respectively the shoulders 26 of the plates 24 and 23, thereby maintaining the front ends of the plates 24 and the rear ends of the plates 23 slightly spaced from the inner walls of the front and rear followers, respectively. It will be evident that outward movement of the shells B is limited by engagement of the abutment lugs 121 with the rear ends of the shoes D, the shells being held in their outermost position by the rounded faces 32 of the shoes engaging the inner sides of the flanges 22, the shoes being in turn limited in their outward movement by the wedge projection of the followers and held in their outermost position by the spring follower plates G, due to the expansive action of the spring resistance, lateral movement of the shoes being prevented by the wedge projections 17 and the groups of friction plates.

In the operation of my improved shock absorbing mechanism, assuming that the front follower A is being moved rearwardly toward the rear follower during buff, a wedging action will be set up between the wedges of the front and rear followers and the shoes D, thereby forcing the opposed groups of plates hard against the side walls of the shells and creating lateral pressure on the plates composing each group and augmenting the resistance therebetween. In this connection it is pointed out that the space left between each follower and shell is such as to permit sufficient relative movement to effect the desired wedging action. During the rearward movement of the front follower A, the front shell will be forced rearwardly toward the rear shell, while the latter is held substantially stationary. Due to the friction existing between the groups of plates and the shells and shoes, there will be a tendency for the plates to move rearwardly with the front shell and an equal tendency for the plates to be held stationary with the rear shell. On account of this balancing action the rear ends of the plates will approach the rear follower at substantially the same rate as the front follower approaches the front ends of the plates. This action continues until the front and rear followers engage respectively with the front ends of the plates 24 and the rear ends of the plates 23, whereupon the plates will be moved relatively by the movement of the followers, until the opposite ends of the respective plates engage with the front and rear followers and the inner ends of the shells abut, whereupon the plates and shells will act in the manner of stop columns, transmitting the ultimate pressure directly from the front follower to the rear follower. It will be evident that the resistance to relative movement of the followers is greatly increased after the same engage the plates and move the same relatively to each other, and that a preliminary action of the mechanism, to take care of light shocks, is thus had before the plates come into play. In addition to the friction created between the relatively moving plates during the rearward movement of the front follower A, friction will also be created between the outermost plates of each group and the inner surfaces of the rear shell B, and between the innermost plates of each group and the outer surfaces of the front pair of friction shoes D. As the followers approach each other, and the plates move relatively to each other, the flanges 22 of the shells and the shoulders 26 of the plates will be separated, thereby assuring certain release of the mechanism, the plates not being picked up by the shells until after the wedging pressure has been reduced sufficiently to assure an easy release. During draft, the action will be the reverse of that just described, the rear follower being moved toward the front follower while the latter is held stationary.

When the actuating pressure is relieved, the wedging pressure is instantly reduced due to the followers moving away from the wedge shoes and the wedge shoes being loosened with respect to the adjacent friction plates. The loosening or collapse of the wedge shoes D is effected at the same time the wedges drop away from the shoes by the shoes being rocked relatively to the front and rear shells B by the expansive action of the spring resistance E. As the spring plates G are forced outwardly the force will be directly applied to the rounded portions 33 of the shoes D and as the rounded bearing portions 32, which are adapted to rock on the inner faces of the flanges 22, are disposed outwardly with reference to the portions 33 engaged by the spring followers, the inner ends of the shoes will be swung inwardly toward each other thereby swinging the faces 27 out of surface contact with the innermost friction plates 23 of each group. Inward swinging movement of the shoes D is limited by engagement of the flat faces 29 thereof with the outer curved bearing surfaces 34 of the spring follower plates G, or by engagement of the inner surfaces of the longitudinal wall of each shoe D with the outer edges of the spring resistance E. Upon reduction of the wedging pressure, expansion of the spring resistance E forces the shoes and shells outwardly. After the wedging pressure on the groups of plates has been thus reduced, as the spring followers move outwardly, the plates are picked up by engagement of the ribs 22 with the shoulders 26 of the plates and all the parts are restored to normal position.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with front and rear followers, movable relatively toward and from each other; of front and rear shells movable respectively with said followers; a spring resistance; a longitudinally arranged wedge pressure creating means including friction shoes having rocking engagement with said shells; and longitudinally arranged co-acting friction plates adapted to move relatively during said relative movement of said followers and shells, said plates being divided into two groups on opposite sides of said pressure creating means.

2. In a friction shock absorbing mechanism, the combination with front and rear main followers; of oppositely arranged, front and rear, friction shells; a spring resistance; a longitudinally arranged wedge pressure creating means co-acting with said followers, said means including oppositely disposed tiltable wedge shoes adapted to be held apart during compressive action of the mechanism; a plurality of relatively movable sets of friction plates within said shells, said plates being divided into two groups on opposite sides of said pressure creating means; spring followers; and co-acting means on said shoes and spring followers for swinging the shoes out of face contact with said groups of plates during release of the mechanism.

3. In a friction shock absorbing mechanism, the combination with front and rear main followers, said followers being relatively movable toward and from each other; of oppositely arranged, front and rear, relatively movable friction shells; a spring resistance; a longitudinally arranged wedge pressure creating system co-acting with said main followers, said system being collapsible during release of the mechanism; longitudinally arranged co-acting friction plates adapted to be moved relatively during relative movement of said followers toward each other, said plates being disposed within said shells and divided into two groups on opposite sides of said wedge pressure creating system; and means interposed between said spring resistance and wedge system for effecting collapse of the latter when the actuating pressure is removed.

4. In a friction shock absorbing mechanism, the combination with front and rear main followers movable relatively toward and from each other; of oppositely arranged, front and rear, friction shells having bearing means thereon, said shells being relatively movable toward and from each other; a spring resisting relative approach of said shells; wedges movable with said front and rear followers; a plurality of wedge shoes co-acting with said wedges, and having rocking engagement with said bearing means; longitudinally arranged co-acting friction plates co-operable with said shoes and adapted to be moved relatively upon said relative movement of said followers, said plates being divided into two groups disposed within said shells and on opposite sides thereof.

5. In a friction shock absorbing mechanism, the combination with front and rear followers having wedge means movable therewith; of oppositely arranged, relatively movable, front and rear friction shells; a plurality of longitudinally arranged sets of friction plates, each set of plates being adapted to be moved in one direction by one of said shells, the plates movable with the front shell being interposed between the plates movable with the rear shell, and said plates being arranged in groups at opposite sides of said shell; friction shoes interposed between said groups of plates and the wedge means and adapted to rock on said shells; a spring resistance; and spring follower means engaging said shoes and adapted to rock the same during release of the mechanism to break the frictional resistance between the shoes and the plates.

6. In a friction shock absorbing mechanism, the combination with oppositely arranged front and rear followers; of a pair of friction shells provided with interior friction surfaces, said shells being normally spaced apart and adapted to move relatively; longitudinally arranged friction plates adapted to be moved relatively by said followers, said plates being divided into two groups at opposite sides of said shells, each group comprising two sets of plates; a plurality of wedge blocks movable with said followers; wedge shoes co-operating with said blocks and the groups of friction plates, said shoes being tiltable during release; spring resisted means co-operating with said wedge shoes to disengage the same from the friction plates during the release of the mechanism; and means arranged to engage each plate for restoring each set of plates to normal position.

7. In a friction shock absorbing mechanism, the combination with oppositely arranged, front and rear followers, said followers being relatively movable toward each other; of longitudinally arranged, relatively movable, intercalated friction plates, said plates being arranged in groups on opposite sides of the mechanism and alternate plates being adapted to be engaged and moved by the front and rear followers respectively; longitudinally arranged lateral wedge pressure creating means at opposite ends of said mechanism, adapted to cooperate with said followers, said means including a pair of friction shoes adapted to rock toward each other to break the frictional resistance between the same and the plates; front and rear friction shells housing the said plates, said shells being normally spaced apart and adapted to be moved relatively upon said relative movement of said followers; means for yieldingly resisting relative approach of said shells and restoring the same to normal position; and inter-engaging means on said shoes, shells and plates for restoring said shells and plates to normal position.

8. In a friction shock absorbing mechanism, the combination with a shell; of a wedge pressure creating means including friction shoes, said shoes being mounted for rocking movement on said shell; a plurality of friction plates within said shell, said plates being adapted for relative movement, and being divided into two groups on opposite sides of the pressure creating means, and means for yieldingly opposing movement of said shoes.

9. In a friction shock absorbing mechanism, the combination with a shell having interior friction surfaces; of a spring resistance; friction wedge pressure exerting means within said shell, said means including a pair of opposed shoes adapted to be swung inwardly away from the walls of the shell during release action of the mechanism, and means for yieldingly resisting movement of said shoes.

10. In a friction shock absorbing mechanism, the combination with front and rear followers; of a plurality of intercalated relatively movable friction plates; means for placing said plates under lateral pressure, including friction shoes; means co-acting with said shoes for supporting said shoes for rocking movement; and a spring resistance co-acting with said shoes.

11. In a friction shock absorbing mechanism, the combination with front and rear main followers; of a spring resistance; longitudinally arranged wedge-pressure-creating means co-acting with said followers; said means including tiltable wedge shoes adapted to be held apart during compressive action of the mechanism; a plurality of relatively movable intercalated friction plates co-acting with said shoes; means for resisting lateral movement of said plates in an outward direction; spring followers; and co-acting means on said shoes and spring followers for swinging the shoes out of face contact with said plates during release of the mechanism.

In witness that I claim the foregoing I have hereunto subscribed my name this 10th day of October, 1923.

STACY B. HASELTINE.